(12) United States Patent
Rihaczek et al.

(10) Patent No.: US 7,626,536 B1
(45) Date of Patent: Dec. 1, 2009

(54) NON-SCANNING RADAR FOR DETECTING AND TRACKING TARGETS

(75) Inventors: August W. Rihaczek, Rolling Hills, CA (US); Richard L. Mitchell, Palos Verdes, CA (US)

(73) Assignee: MARK Resources, Inc., Torrance, CA (US)

( * ) Notice: Subject to any disclaimer, the term of this patent is extended or adjusted under 35 U.S.C. 154(b) by 130 days.

(21) Appl. No.: 11/115,487

(22) Filed: Apr. 26, 2005

Related U.S. Application Data

(60) Provisional application No. 60/565,942, filed on Apr. 28, 2004.

(51) Int. Cl.
*G01S 13/48* (2006.01)

(52) U.S. Cl. .................... 342/96; 342/99; 342/107; 342/140; 342/156; 342/149

(58) Field of Classification Search .............. 342/96
See application file for complete search history.

(56) References Cited

U.S. PATENT DOCUMENTS

| | | | | |
|---|---|---|---|---|
| 2,422,107 A | * | 6/1947 | Luck | 342/434 |
| 2,852,772 A | | 9/1958 | Gitzendanner | |
| 3,218,639 A | * | 11/1965 | Mercer et al. | 342/90 |
| 3,242,487 A | * | 3/1966 | Hammack | 342/103 |
| 3,479,494 A | | 11/1969 | Wilmotte | |
| 4,184,154 A | | 1/1980 | Albanese et al. | |
| 4,471,357 A | | 9/1984 | Wu et al. | |
| 4,538,152 A | * | 8/1985 | Wirth | 342/158 |
| 4,670,755 A | * | 6/1987 | Gellekink et al. | 342/194 |
| 4,744,042 A | * | 5/1988 | Hyatt | 708/404 |
| 4,989,008 A | | 1/1991 | Fujisaka et al. | |
| 5,053,784 A | * | 10/1991 | Hippelainen | 342/434 |
| 5,132,688 A | * | 7/1992 | Shima et al. | 342/91 |
| 5,341,141 A | * | 8/1994 | Frazier et al. | 342/59 |
| 5,347,283 A | * | 9/1994 | Krizek et al. | 342/201 |
| 5,361,072 A | | 11/1994 | Barrick et al. | |
| 5,594,451 A | * | 1/1997 | Krikorian et al. | 342/160 |

(Continued)

FOREIGN PATENT DOCUMENTS

DE 3740142 A1 * 6/1989

OTHER PUBLICATIONS

Skolnik, Merril I. "Radar Handbook". 1990. McGraw-Hill. 2nd ed. pp. 2.25-2.26.*

(Continued)

*Primary Examiner*—Thomas H Tarcza
*Assistant Examiner*—Matthew M Barker
(74) *Attorney, Agent, or Firm*—Blakely Sokoloff Taylor & Zafman LLP

(57) ABSTRACT

Radar for detecting and tracking short range airborne targets using a non-scanning beam to illuminate the entire search space, and processing the return signals from a plurality of spaced apart receive antennas. Target angle in one plane may be determined by coherent processing of the returns from the plurality of receive antennas. Spacing the receive antennas apart in three dimensions allows determining of two angles, such as azimuth and elevation. Processing of the returns may be coherent or noncoherent, or returns may be processed both coherently and noncoherently. Programmability of the processing algorithms and parameters provide flexibility in applications, as well as flexibility based on such things as the target type and its range. Exemplary applications are disclosed.

14 Claims, 5 Drawing Sheets

Sketch of Antenna Configuration (four receive antennas shown)

U.S. PATENT DOCUMENTS

| | | | |
|---|---|---|---|
| 5,907,568 A * | 5/1999 | Reitan, Jr. | 342/26 B |
| 6,188,348 B1 * | 2/2001 | Raney | 342/22 |
| 6,239,747 B1 | 5/2001 | Kaminski | |
| 6,292,129 B1 * | 9/2001 | Matsugatani et al. | 342/70 |
| 6,963,314 B2 | 11/2005 | Webb et al. | |
| 7,088,956 B2 | 8/2006 | Kishigami et al. | |
| 2003/0052813 A1 * | 3/2003 | Natsume | 342/70 |
| 2006/0238403 A1 * | 10/2006 | Golan et al. | 342/62 |

OTHER PUBLICATIONS

R. P. Perry et al., "SAR Imaging of Moving Targets", IEEE Transactions on Aerospace and Electronic Systems, Jan. 1999, pp. 188-199, vol. 35, No. 1.

* cited by examiner

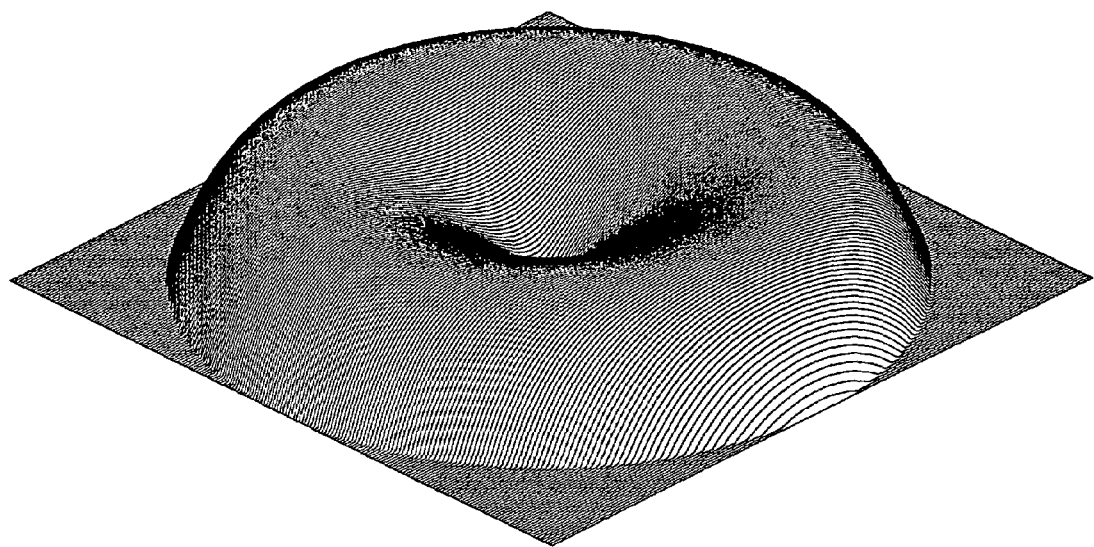
Figure 1a. Sketch of Omni-Directional Azimuth Beam Relative to Ground Plane.
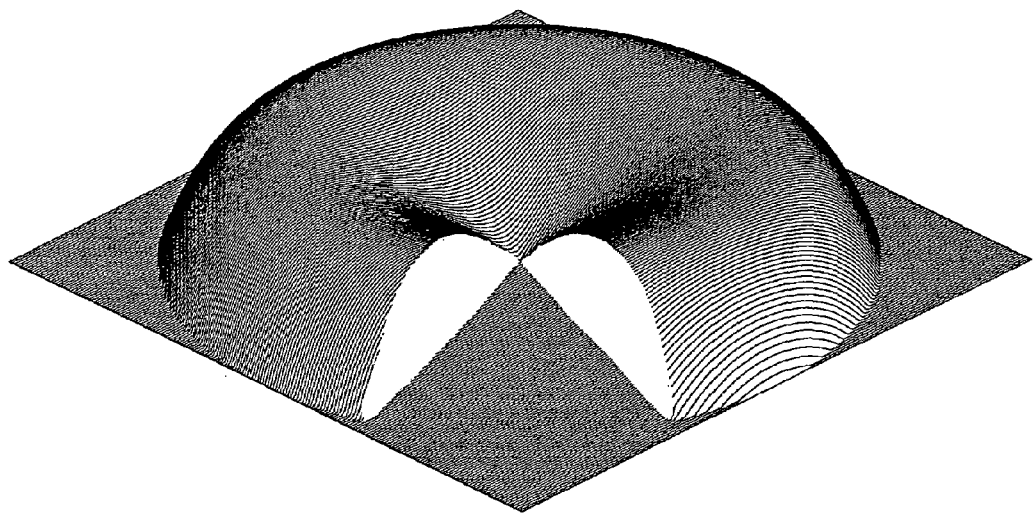
Figure 1b. Cross Section of Beam in Figure 1a.

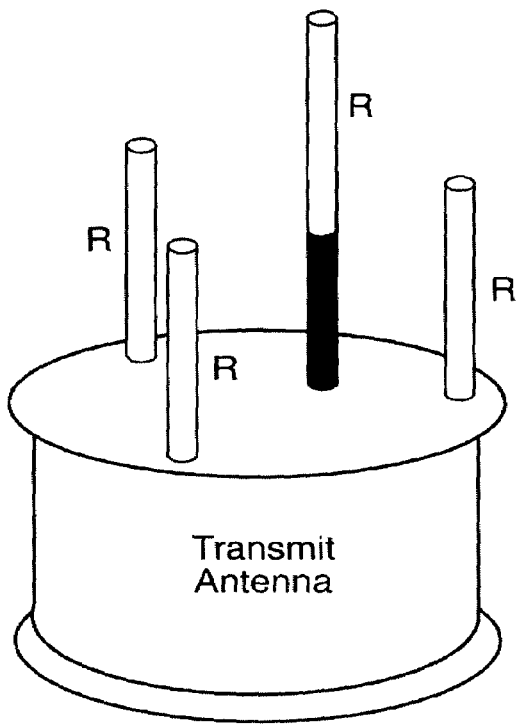
Figure 2. Sketch of Antenna Configuration (four receive antennas shown)
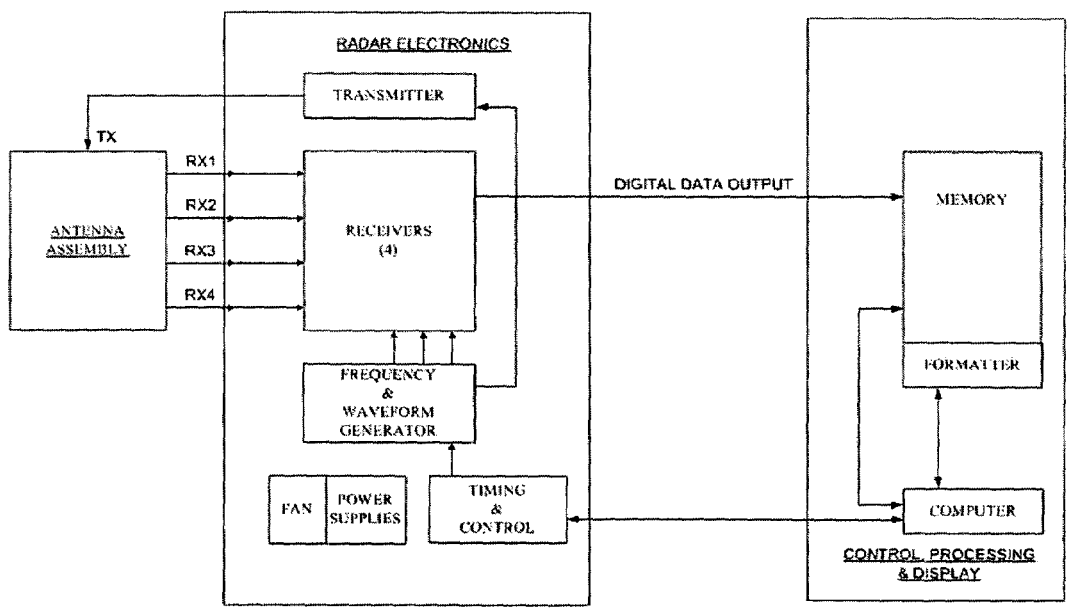
Figure 3. Top Level Block Diagram of Radar Hardware

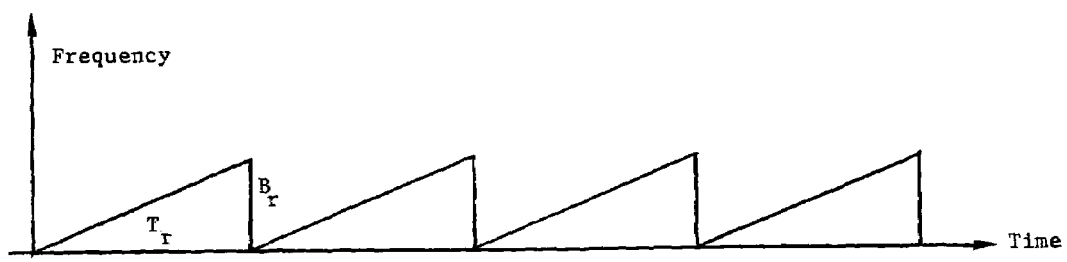
Figure 4. Frequency Modulation on Transmit.
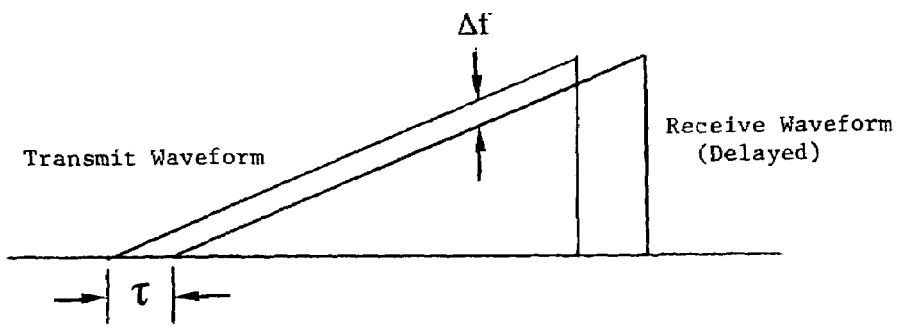
Figure 5. Comparison of Transmit and Receive Waveforms.

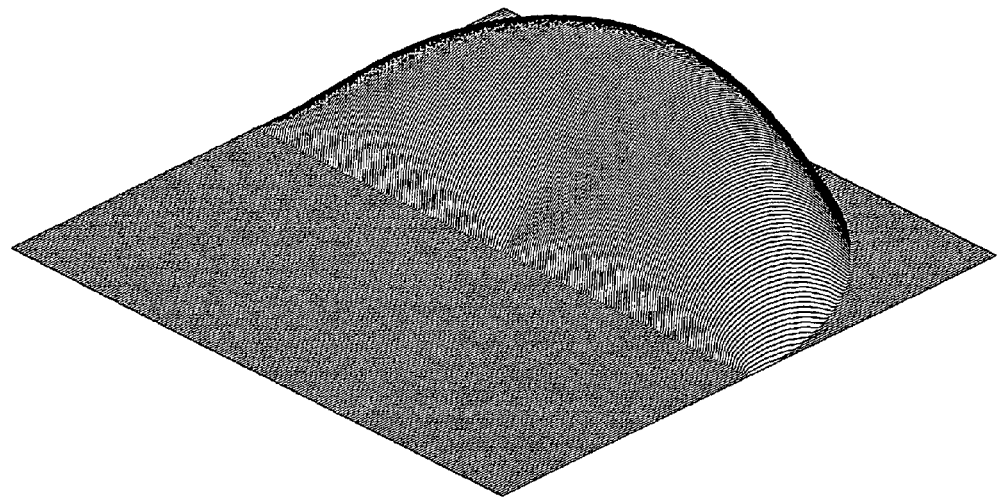
Figure 6. Sketch of Shaped Beam in Azimuth.
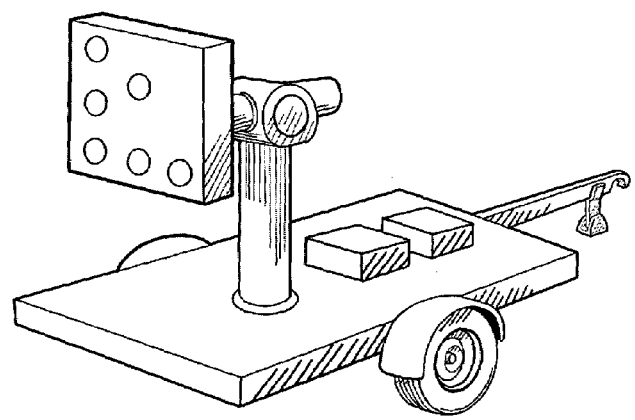
Figure 7. Schematic of Antenna Assembly for a Multiple Object Instrumentation Radar

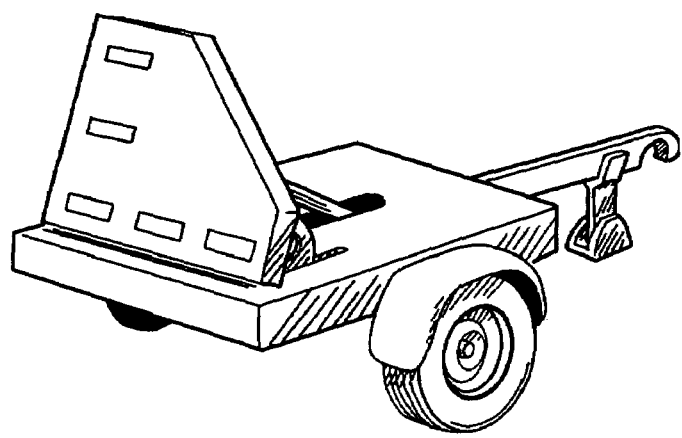
Figure 8. Schematic of Antenna Assembly for Bomb Tracking and Scoring Radar

NON-SCANNING RADAR FOR DETECTING AND TRACKING TARGETS

CROSS-REFERENCE TO RELATED APPLICATION

This application claims the benefit of U.S. Provisional Patent Application No. 60/565,942 filed Apr. 28, 2004.

BACKGROUND OF THE INVENTION

1. Field of the Invention

The present invention relates to the field of radar detection and tracking systems.

2. Prior Art

In conducting a radar search for airborne targets, it is conventional practice to use a narrow antenna beam. For fast-moving targets, especially at short range, the surveillance volume must be rapidly scanned, which leads to a short dwell time on a target. On the other hand, for tracking and discriminating targets, a much longer dwell is needed. These conflicting requirements have traditionally led to an expensive system based on a phased array antenna, or to multiple systems designed specifically for each function. Such expense has been justified in conventional warfare where the general location of the enemy is known, the engagement is fairly static, and the equipment is not in harm's way. However, such systems are no longer appropriate for modern warfare, such as combating insurgents, where an attack can occur at short range, from any direction, and without warning.

The basic requirement for target detection in any radar application is that the return signal must contain sufficient energy relative to the noise power density. This can be accomplished with some combination of high transmit power, an antenna with high gain, and use of a long dwell time on target in the detection process. Range resolution is also an important factor, not necessarily for detection purposes, but for clutter suppression and target analysis (discrimination, classification, or identification). Much of radar system design consists of making trades among these parameters.

There is a practical limit to the transmit power, as increasing power beyond some relatively low level has a disproportionate impact on system cost and reliability. Until now, there has also been a practical limit to the dwell time for detecting targets in clutter, as in the prior art, the target had to be considered essentially stationary within a range gate and Doppler filter during this time. The only item that offered much flexibility in the prior art design is the antenna. However, increasing the antenna gain has two effects: (1) the antenna will be larger, more expensive, and more difficult to transport and setup; and (2) the beam will be narrower, providing less time on target for a given time to scan the surveillance volume.

A slow scan rate might be acceptable for long-range targets, but not for those at short range, and a short dwell time on target combined with low resolution in range might be acceptable for detection purposes, but not for target analysis. Because of mechanical inertia, the fast scan rate and long dwell time are incompatible for a radar that employs a conventional reflector antenna. One solution would be to use separate antennas (or separate radars) for search and track, but mechanical inertia in the antenna again limits the number of widely dispersed targets that can be tracked at any one time. Under stressing conditions one could theoretically devote additional radars to this task, but a more practical approach is to use a phased array antenna, which can interleave tasks without having to be physically rotated.

Phased arrays, however, are typically large, immobile, and very expensive. Such expense has been justified in conventional warfare, where the action takes place at long range and in a sector no wider than about 120°. Three such arrays would be required to cover all directions, which is a tripling of the size and cost of an already large and expensive system. Such systems are totally unsuitable for modern warfare, where targets can appear suddenly at short range, and from any direction.

BRIEF DESCRIPTION OF THE DRAWINGS

FIG. 1 illustrates an exemplary omni-directional beam in azimuth and a fan beam in elevation useable with the non-scanning radar of the present invention.

FIG. 2 presents a schematic illustration of one basic antenna configuration useable with the non-scanning radar of the present invention. It consists of a transmit antenna ring, and four dipole-like receive antennas.

FIG. 3 presents a top-level block diagram to support the four-antenna configuration in FIG. 2.

FIG. 4 illustrates the linear sweep of frequency modulation over the wideband useable with the non-scanning radar of the present invention.

FIG. 5 illustrates the frequency shift between the transmitted signal and the received signal, which is dependent on the target range.

FIG. 6 illustrates a shaped beam in azimuth useable with the non-scanning radar of the present invention.

FIG. 7 illustrates the placement of multiple antennas that may be used with the present invention as an interferometer for use, by way of example, in a multiple-object instrumentation radar.

FIG. 8 illustrates an exemplary mounting of multiple antennas on a fixed backboard for use, by way of example, in a bomb scoring radar.

DETAILED DESCRIPTION OF THE PREFERRED EMBODIMENTS

The preferred embodiments of the present invention are based on replacing the traditional narrow antenna beam with one that illuminates the entire surveillance sector continuously, eliminating the scan entirely. The antenna is thus simple and inexpensive. The need for angle measurements is met with a simple interferometer, utilizing multiple antennas on receive, and the loss in antenna gain is offset by a much longer processing time for detection purposes (hereinafter called long dwell time or long-term processing, namely long in comparison to that used in a conventional surveillance radar). Although this long-term signal processing is much more intensive than that required for the traditional approach, it is nevertheless practical in the present modern computer age. In effect, the system expense is transferred from the antenna to the signal processor. In this regard, it is the software that is initially expensive, not the digital hardware, but the former is a non-recurring expense.

Since the surveillance volume is illuminated continuously, all radar functions can be performed simultaneously, including search, track, and target analysis (discrimination, classification, or identification) and each can be updated as often as needed, independently of each other. Moreover, the signal processing details can be tailored to threat and target range.

Since the antennas are small and there are no rotating parts, the system will be very compact, easy to setup, and simple to operate, even on a moving or airborne platform. Software programmability and use of interchangeable antennas can satisfy many different applications and coverage requirements, including radars on the ground, onboard ships or boats, in the air, and even in space. Perhaps most important, since the hardware is inexpensive, it can be considered expendable.

The transmit power can be increased to reduce the dwell or processing time for detection purposes, but there is a practical limit to the transmit power for such an inexpensive and compact system. This implies that the radar will have limited range of operation that depends on the extent of the surveillance sector, the size of the target, and the digital processing resources that can be used. Nevertheless, it has several important military applications, including the following:

- Detecting and tracking of hostile fire, including incoming mortar shells, rockets, missiles, bullets and projectiles
- Locating source of attack
- Detecting and tracking aircraft, helicopters, unmanned air vehicles, and other airborne objects
- Detecting and tracking boats, ground vehicles, and other objects on the sea surface or ground
- Directing outgoing counter-fire
- Surveillance of airspace
- Scoring of artillery, direct-fire objects, and bomb drops
- Continuous tracking of multiple objects in a test range environment Moreover, the radar can even be used on an airborne platform or space based platform to detect airborne targets, ships, and moving ground vehicles.

In summary, this new design principle covers all radar applications where a narrow-beam antenna is currently being used to scan a surveillance volume, and the conditions are such that the antenna can be replaced with one or more that continuously illuminate the entire surveillance sector. What is lost in antenna gain is offset by a longer processing time for detection purposes. Software programmability offers considerable flexibility in how the radar is used for all modes, including search, track, discrimination, classification, and even identification. Moreover, these modes can now be implemented simultaneously, which is not possible with a scanning-beam radar.

General Design Considerations

The problem with the prior art is the narrow beam, regardless of whether it is formed by a phased array or a more conventional antenna. The present invention matches the antenna beam to the desired surveillance sector, so that all targets therein are illuminated simultaneously and continuously. The loss in antenna gain is offset by increasing the dwell or processing time on the target for detection purposes. There is a potential problem with this approach as fast-moving targets can move through many range resolution cells, which must be relatively narrow for target analysis purposes and to provide some degree of clutter suppression. The processing of the signal for detection purposes now has to include a search for the unknown and possibly complicated motion of the target.

In the modern computer age, however, digital signal processors have become very fast, compact, and inexpensive, which means that it is now practical to perform a matched-filter search for the unknown target motion. Moreover, the complexity of the system is shifted from very expensive and immobile radar hardware to relatively inexpensive and highly reliable digital equipment. The resulting system will also be much more compact, which is extremely important in modern warfare.

Exemplary Design

To illustrate an embodiment of the invention, an exemplary design based on detecting and tracking incoming mortar shells, rockets, missiles, and possibly even bullets will be described. The following very demanding requirements are imposed:

Surveillance sector of 360° in azimuth
Minimum detectable target RCS of 0.03 m$^2$ at 3 km
Operating range extending to 10 km for larger cross section targets
Target detection to be accomplished within one second
The basic features of this exemplary design are as follows:

Frequency Band

A lower carrier frequency is better for search, in terms of power, blind speed avoidance, and reduced susceptibility to rain clutter, but a higher frequency provides better Doppler sensitivity (resolution) for discrimination purposes. For the exemplary design, the C-band (approximately 5 GHZ) is being selected, though this is a matter of choice based on the desired performance, not a limitation of the invention.

Antenna

The antenna will have an omni-directional beam in azimuth, and a fairly narrow fan beam in elevation, as shown in FIG. 1. The elevation beam is shaped so the gain is about 10 dB at the lower elevation angles. It can be formed by a line source about six inches tall (at C-band). Since no mechanical rotation is required, there is no need for slip rings, and the pedestal can be very simple. FIG. 2 presents a schematic illustration of one basic antenna configuration that resembles a birthday cake. It consists of a transmit "ring" and four "candle" antennas (R), where the latter are used as an interferometer to measure angles. One of the receive antennas is higher than the rest to provide a measurement capability in the elevation dimension. There is a separate receiver section for each receive antenna. Many of the components can be shared as shown in the top-level block diagram in FIG. 3.

Bandwidth

One of the problems with an omni-directional beam is increased clutter, which can be partly offset with high range resolution. In this exemplary design, a bandwidth of 100 MHz is specified, which provides a resolution in range of about 1.5 m. Higher resolution may be needed for target discrimination and analysis, but the primary impact of high resolution is on the complexity of the signal processor.

Type of Waveform

The only practical waveform for this application is FM/CW (frequency modulated continuous wave), which offers continuous transmission for low peak power, a large bandwidth for clutter suppression and target discrimination, and the ability to detect targets at very short range. For equipment simplicity, the frequency modulation should be a linear sweep over the wide band needed for range resolution. This sweep is repeated without gaps, in saw-tooth fashion as shown in FIG. 4, and processed coherently in the receiver.

In principle, one can process the received signal by mixing it with the transmit signal, so that the result is an offset in frequency that is proportional to the target delay. However in practice, the result of the mixing operation will be at IF, not baseband, to simplify the hardware.

Let $\tau$ be the delay. The frequency shift (see FIG. 5) is given by:

$$\Delta f = (B_r/T_r)\tau$$

where $T_r$ and $B_r$ are the length and bandwidth of the linear FM sweep. Let $B_{if}$ be the width of the IF passband in the receiver, which is given by:

$$B_{if} = (B_r/T_r)\tau_{max}$$

where $\tau_{max}$ is the maximum delay of interest. For the exemplary design, $B_r$=100 MHz and $\tau_{max}$=67 µs (for the specified maximum operating range of 10 km). In order to keep the processing losses to a minimum, the repetition period of the waveform should be at least about five times the maximum delay of interest, or 333 µs. Substituting:

$$B_{if} \geq 20 \text{ MHz}$$

In order to satisfy the Nyquist criterion, the A/D converter rate must be at least double this amount (for a single device), and for hardware simplicity there should be an additional margin of about 25%. The resulting A/D converter rate will be about 50 MHz, which is well within the range of affordable commercial devices. The maximum range of operation and/or the bandwidth could be extended, if necessary, and still utilize commercial devices. The only additional cost is in the complexity of the signal processor.

Note that the average sample rate is $B_{if}$. The A/D converter should have a dynamic range of at least 12 bits, so the average data rate in the above example is 30 MB/s.

Blind Speeds and Blind Ranges

The first blind speed (at C-band) is 75 m/s, and the first blind range is at 10 km, as determined by the width of the IF passband. This blind range interval extends to 25 km, corresponding to the waveform repetition period of 167 ps.

Normally, one should not operate with blind speeds for any length of time. However, since the exemplary design employs such long coherent integration times (as much as 0.5 second), the blind speed interval will be very narrow, approximately 0.10 m/s at C-band. It is extremely unlikely that an object will remain in such a narrow blind speed interval for very long.

Range Ambiguous Targets

Targets between 25 and 35 km in range will also appear in the IF passband, just as targets in more distant range-ambiguous intervals. The primary concern here is that a large object at long range, such as an aircraft, might be mistaken for a legitimate target at short range. Discrimination is thus an important consideration, and for reliable discrimination one needs high resolution in range.

Detection Performance

Define $P_t$ as the continuous transmit power, $T_d$ as the coherent processing time, G as the antenna gain, $\lambda$ as the wavelength, $\sigma$ as the target RCS, and r as the target range. The signal-to-noise ratio for detection purposes, defined as the ratio of received signal energy and noise power density, is given by $$SNR=[P_t T_d G^2 \lambda^2 \sigma]/[(4\pi)^3 r^4 kTFL]$$

where k is Boltzmann's constant, T is the reference temperature in the receiver, F is the receiver noise figure, and L represents the system losses. Assume that $P_t$=3 W, $T_d$=0.5 s, G=10 dB, $\lambda$=0.05 m, $\sigma$=0.03 m$^2$, r=3 km, kT=-204 dBw-s, and the product FL=2 dB, which results in:

$$SNR=10 \text{ dB}$$

This is fairly respectable detection performance (almost 50% detection probability for a non-fluctuating target and a false-alarm probability of $10^{-6}$). Moreover, by noncoherently summing the outputs of the four receivers, the probability of detection will be increased to over 95%. A few additional dB can be gained by implementing some combination of the following: increased transmit power, increased coherent processing time, and/or reduced width of the beam in elevation.

Solid State Transmitter

The 3 watts of power at C-band is easily accommodated with solid state technology, and such equipment is readily available in the commercial marketplace. There are several advantages of solid state over tubes, including long life, high reliability, low-voltage operation, and excellent stability.

Signal Processing

The non-scanning configuration requires that the received signal be processed for a long time (0.5 second in the above example) in order to meet the postulated requirement for detection performance. The signal processing in this case will have to be very intensive because a target moving at 300 m/s directly toward the radar will traverse 100 range cells in 0.5 second. A type of processing known as keystone processing can be used to simplify the range alignment. (See "SAR Imaging of Moving Targets", R. P. Perry et al., IEEE Transactions on Aerospace and Electronic Systems, January 1999, Vol. 35, No. 1, Pgs. 188-199.)

There are various ways to simplify the processing, primarily by using a combination of both coherent and noncoherent integration. For example, one can divide the 0.5-second processing interval into five 0.1 s groups, where each group is processed coherently, but the envelope-detected outputs of each group are combined noncoherently. The amount of the gain or loss in practice will depend on the nature of the target fluctuation.

Because of the long coherent integration time, the signal processing will have to be based on a matched-filter search in range, range rate, and possibly even in range acceleration. The search is simplified with keystone processing and also by increasing the number of noncoherently processed groups, with a slight penalty in detection performance.

This non-scanning configuration also offers considerable flexibility in how long the signals are processed. For example, one can process for a longer time just at long range in order to increase the detection performance, but for a much shorter time at short range for faster response time and better utilization of computation resources. Note that the different processing algorithms can be implemented concurrently as long as there is sufficient computer power.

Clutter Suppression

The area of a 1.5-meter "ring" on the ground at the range of 3 km is about 30,000 m$^2$. Assuming a pessimistic clutter backscatter coefficient of -25 dB, the clutter cross section will be about 20 dBm$^2$, which is a factor of 35 dB greater than the postulated target cross section of 0.03 m$^2$. Therefore, clutter will need to be suppressed (via Doppler filtering) by at least 50 dB under these conditions. With modern radar technology it is possible to achieve even better performance, which may be necessary in an urban environment.

Short-Range Clutter

Because of the FM/CW waveform and the 360° beam, the most serious "clutter" problem is a reflection from a nearby building, which could saturate the receiver if no precautions are taken. One solution to this problem is to construct the transmit antenna in FIG. 2 as two-half cylinders in a ring, which are independently fed by the transmitter. Then only one side will be energized if saturation is encountered from the other side.

Discrimination

There are two significant discrimination problems: birds and range-ambiguous aircraft, both being comparable in strength to the small targets of interest. Because of their low speeds, birds can be readily discriminated from rockets and missiles, but not always from mortar shells. For reliable discrimination, one must rely on the backscattering behavior of the objects, not on range rate or cross section, and this requires a fairly long observation time. Discrimination of range-ambiguous aircraft can be done on the basis of their range extent, which requires high resolution in range with the use of a large bandwidth. In principle, one could even classify or identify aircraft.

Angle Measurement

Since one wide-beam antenna has no measurement capability in angle, additional antennas are needed to provide reasonable measurement accuracy. The simplest configuration to measure angles in azimuth and elevation is one transmit antenna combined with four receive antennas (R), as shown in FIG. 2, where the latter are used as an interferometer to provide the required accuracy. There are various processing options. The simplest is to process just one receive channel for detection, and then the others only for an angle measurement. For improved detection performance, the outputs of the four receive channels can also be combined noncoherently. This places a lower limit on the size of the range resolution cell.

An element spacing of one foot will produce grating lobes spaced by about 10° at broadside (at C-band), which will provide a measurement accuracy of better than 5% of that amount. Once the target is in track, it will be straightforward to resolve the angle ambiguity based on the trajectory.

Shaped Beam in Azimuth

The exemplary system is designed to cover 360° in azimuth. The same basic design can also be used with a shaped beam in azimuth to provide reduced coverage, say over ±90° (see FIG. 6), with a corresponding gain in detection performance. One can also use interchangeable antennas to tailor the coverage to the anticipated threat.

Interference Issues

C-band was selected for this radar, which band is already utilized by several other radar and communication systems. However, because of the low power, the low antenna gain, and the wide bandwidth of the waveform, this radar should not pose an interference problem for other systems, and for the same reason, the other radars should not interfere with this one.

However there is a potential interference problem if multiple non-scanning radars of this type are operating in the same vicinity. This interference can be avoided by using different parts of a wide tunable band, by employing both up- and down-frequency sweeps (or chirps), and by synchronizing the transmissions. This may not even be necessary as such interference will appear as a stationary target (if the interfering radar is stationary), and will be suppressed with the clutter.

Summary of Important Features of Concept

The most important features of the preferred embodiments include small and inexpensive hardware, ease of operation, software programmability, and low probability of intercept.

Inexpensive Hardware

One of the main advantages of the radar system is that the hardware is inexpensive, and therefore expendable. Most of the hardware cost is associated with the power needed to detect the very low cross section targets. In the exemplary design, the power is only 3 watts, which is easily accommodated at C-band with solid state technology, and such equipment is readily available in the commercial marketplace. The remaining components will be very inexpensive, especially in production.

The signal processing for this radar may require several digital signal processors (DSPs) or field programmable gate arrays (FPGAs) running in parallel, as well as a substantial amount of addressable memory to achieve the performance desired. Nevertheless, with modern computer technology, the signal processing hardware is still affordable and continues to come down in cost.

Ease of Operation

Since the antennas are small and there are no rotating parts, the system will be very compact and lightweight. It will be very easy to set up and simple to operate. It could even be installed on the roof of a motor vehicle, and operated while the vehicle is moving.

Software Programmability

Another important feature of the preferred embodiments is that the same hardware can be used in a wide variety of applications and engagements, since the system is easily optimized to meet each threat. The radar can be completely programmable, including the waveform parameters and processing details, where the latter are limited only by the signal processing resources. Some of the programming options are as follows:

Choice of bandwidth, sweep time, and length of processing time used for detection Same or different processing time for search, track, and discrimination How coherent and noncoherent integration are combined for detection Perform search and track simultaneously or sequentially Use of only one antenna for search or all four simultaneously Use of different processing parameters as a function of range In addition to these programming options, the radar can be designed initially according to the digital processing technology available today, and upgraded as more capable digital hardware becomes available.

Low Probability of Intercept

All of the general principles of LPI radar are employed in the new design concept: low peak power, low antenna gain, long coherent processing time, and wide bandwidth. For the same reason, use of anti-radiation missiles by the enemy would be ineffective.

Specific Applications

While this invention is useable in many radar applications where a narrow-beam scanning antenna is replaced by one or more antennas that do not scan, some specific applications are now described to illustrate the practicality and versatility of the invention.

Ground Based Radar to Detect Hostile Fire

As already alluded to, an ideal application for the non-scanning radar is for detecting and tracking hostile fire coming from any direction, including bullets, mortar shells, rocket propelled grenades, and anti-tank missiles. By utilizing a non-scanning antenna to illuminate the entire surveillance sector continuously, all of the expensive items associated with conventional radar are eliminated (large antenna, phased arrays, rotating joints, heavy pedestal, and high-power transmitter). The surveillance sector can even be 360° in azimuth and sufficiently high in elevation to see all of the high-flying threats of concern. Detection, track, discrimination, and threat identification can be performed simultaneously on the same data, and the origin of the threat can be determined very accurately by processing the signal that is already recorded instead of using a much less accurate method based on track extrapolation. In other words, the track is established essentially at the same time as detection. The system will also be able to detect, track, and direct counter fire. It can also be mounted on a moving vehicle.

The hardware for this radar system consists of an antenna assembly, transmitter, multiple receivers, and a computer. One possible configuration for the antenna assembly is as shown in FIG. 2, which consists of five antennas with omni-directional patterns in azimuth. Four of these antennas are used for reception and one for transmit, where the receive antennas are also used as an interferometer to measure angle. Three of the receive antennas are for the target azimuth measurement, with the fourth at a different height for the target elevation measurement. For operation at C-band, the height of each antenna element will be about six inches, and the edges of the base will be about one foot. A separate receiver section is needed for each receive antenna, as illustrated in FIG. 3, but many of the components can be shared. The transmit power needed for this radar depends on the extent of the surveillance sector, the target RCS (Radar Cross Section), the detection range, and the time allowed for detection. An average power of about 3 watts should be adequate to detect most of the objects of interest at short range.

Airborne Surveillance Radar

The design of an airborne surveillance radar to detect and track targets in the air, on the ground, and on the sea surface can follow that of the ground based radar to detect hostile fire, except for the design of the antenna and the details of the signal processing. The following discussion will be limited to the look-down mode, where detection performance is limited by the ground clutter that is illuminated by the antenna beam.

There are two basic modes of operation for a conventional scanning-beam surveillance radar that depend on whether the target return is within the clutter spectrum or outside. For the former, the radar must employ high resolution in both range and Doppler in order to reduce the area of the clutter cell on the ground that competes with the target. This mode is usually called synthetic aperture radar (SAR), which is used not only for mapping the ground but also for detecting slow moving targets. For this mode of operation the size of the patch on the ground that is illuminated by the antenna beam is fairly restricted.

When the target return is outside of the clutter spectrum, as defined by the antenna beam, detection becomes simpler in principal because the only interference is from clutter illuminated by the antenna sidelobes. The problem for this so-called pulse-Doppler mode of operation is that several pulse busts must be employed with different pulse repetition frequencies to ensure that the Doppler-ambiguous target return will be outside of the clutter spectrum on at least one of the bursts. In effect, the radar sacrifices energy in order to be able to detect these fast-moving targets.

The situation for the non-scanning beam of the preferred embodiment is similar to SAR because the target return will usually be within the clutter spectrum regardless of the pulse repetition frequency. However, unlike conventional SAR, there will be more clutter because of the wider antenna beam, and this clutter may be intensified by range and Doppler ambiguities. Since the Doppler width of the clutter cell is inversely proportional to the coherent processing interval, it is clear that a long processing time, in addition to high resolution in range, is needed to suppress the clutter. Continuous illumination of the entire surveillance sector offers the opportunity to have very long processing times, perhaps a thousand times longer than that used in a conventional pulse-Doppler radar. Moreover, since there is no longer any need to employ several different pulse repetition frequencies for detection purposes, there is a significant gain in efficiency relative to a conventional scanning-beam system. There is a similar gain in efficiency relative to conventional SAR because of the much wider area on the ground that can be illuminated by the antenna beam.

If the clutter behaved as thermal noise, then the only thing that matters is the average clutter power within the resolution cell that competes with the target return. But most clutter does not behave as thermal noise. Terrain clutter is nonhomogeneous, and sea clutter has a very "spiky" behavior, such that both can have adverse consequences on detection performance. Another way of stating the problem is that the clutter spectrum is described by non-Rayleigh fluctuation statistics that tend to persist for a considerable time. However, as long as the target moves with respect to the ground, the clutter that competes with a target will fluctuate more rapidly and behave more like thermal noise, as characterized by Rayleigh statistics.

Ship-Based Radar to Detect Surface Targets

Detecting surface targets with a ship based radar is an ideal application for a non-scanning radar because the antenna beam in the elevation dimension needs to illuminate only the surface of the sea, and the detection ranges are limited by the relatively short distance to the radar horizon. Both factors help to reduce the power requirement. Otherwise, the design of the radar can also follow that for a ground based radar to Detect Hostile Fire, except for a slightly different antenna configuration.

The long processing times offered by the non-scanning antenna are extremely important for target classification and identification. While it is possible to image a target with a relatively short processing dwell, such images are rarely usable for classification and identification because of distortions induced by the motion of the target. In order to be usable, the predominant motion of the target must be about one axis, which means that the radar needs to observe the target for a sufficiently long time for this to happen. This observation time is typically at least about one second, within which a few milliseconds of data may be available to form a usable image.

The non-scanning radar is also ideal for a submarine periscope radar, where the time of exposure is to be minimized. The radar can operate for just a few seconds and collect all the data necessary for target detection, bearing estimation, classification and/or identification. Such performance is not possible with any radar based on a scanning antenna.

Multiple-Object Instrumentation Radar

The current gold standard for multiple-object tracking radars at test ranges is the Multiple Object Tracking Radar (MOTR), which had a limited production run of five units. This phased array radar is very expensive, and very difficult to maintain, operate, and transport. It is possible to design a much simpler and less expensive radar with comparable performance that is based on the principle of a non-scanning antenna.

The MOTR operates at C-Band, which is also ideal for the non-scanning radar, primarily because of the availability of high-power solid-state transmitters. The instantaneous bandwidth can easily be at least about 150 MHz (compared to 4 MHz for the MOTR), which will provide a nominal resolution in range of better than one meter, and a measurement precision in range of a few centimeters.

Since antenna gain plays such an important role in the radar range equation, interchangeable antennas can be used for different missions to illuminate the specific surveillance sector of interest. At long range, a fairly narrow beam can be used, nominally 12°, which covers a sector of over 20 km at the range of 100 km (the beam will move to keep the targets continuously illuminated). This is a difference in gain of over 20 dB compared to the MOTR, which is a performance advantage for the MOTR of about 41 dB. The basic antenna element will be about 30 cm in diameter at C-band. For short-range missions, a much wider beam (and smaller antenna) can be used, where gain is no longer important. Note that the basic antenna sizes can be tailored to the mission. The individual antennas are inexpensive, so that multiple configurations will be affordable.

High measurement accuracy in angle is achieved with multiple receive antennas used as an interferometer, as illustrated in FIG. 7. As shown, three receive antennas are needed along each orthogonal axis to resolve the angle ambiguities inherent with an interferometer, but one antenna can be shared, for a total of five. A sixth antenna is needed for the transmitter to provide isolation if an FM/CW waveform is used. This antenna complex can be mounted on a backboard that is about two meters square (at C-band). A separate set of smaller antennas can be mounted on the same or different backboard for use in the short-range mode of operation.

An ideal waveform for this non-scanning radar is again FM/CW, which offers continuous transmission for low peak power, and a large bandwidth for resolving multiple targets and accurate measurement of range. For equipment simplicity, the frequency modulation is a linear sweep over the wide band needed for range resolution.

Although the MOTR has a peak power of about 1 MW, the average power in a ¼-μs pulse at the PRF of 320 Hz is only 80 W. For comparison purposes, one can configure the non-scanning radar with 2 kW of continuous power (and a solid state transmitter), which is a performance advantage of 14 dB over the MOTR. Note that the power is easily scaled to the particular mission. Primarily because of newer technology, the non-scanning radar will have an advantage in combined noise figure and losses of about 5 dB over the MOTR. For improved detection performance, the outputs of the five receivers can be combined noncoherently to provide an effective gain in detection performance of about 6 dB (the outputs are reprocessed coherently to measure angle).

Detection performance for the MOTR is based on a single pulse, whereas the present invention radar must take advantage of coherent integration. A longer coherent integration time provides more gain, at the expense of more intensive processing. For example, a coherent integration time of 0.1 s corresponds to 32 pulses at the PRF of 320 Hz for the MOTR, for a gain of 15 dB. All of the above factors result in detection performance that is comparable to the MOTR. The performance can also be enhanced, if necessary, by utilizing some combination of a narrower antenna beam, increased power, and/or more coherent integration. Such flexibility is not available with the MOTR (or any phased array radar system).

This comparison is based on a single target. The MOTR must distribute its available energy among multiple targets in track, and must also spend time searching for new targets and reacquiring those that have been lost, whereas with the present invention radar, the entire surveillance sector is illuminated continuously, and returns from all targets are processed simultaneously. As long as the MOTR can increase its PRF so that the effective energy per beam position remains the same, then the above comparison is not affected. However, any performance advantage the MOTR has can easily vanish in a multiple target engagement. Moreover, the MOTR can easily lose track of targets (because of a low update rate), and some targets may never be acquired in the first place, neither of which can happen with the non-scanning radar.

Bomb Scoring Radar

Tracking and scoring of multiple bombs released from an aircraft is also an attractive application for a non-scanning radar in accordance with the present invention. It should employ high resolution in range in order to isolate individual bombs, which will also allow the radar to achieve high measurement accuracy in that dimension. A set of small antennas is employed (one on transmit and four on receive) to provide the required high accuracy in angle via interferometry. The antennas will illuminate the entire bomb corridor, so there is no need to move them in real time (only four receive antennas are needed for this application because of the fairly predictable nature of bomb trajectories). The antennas can be mounted on a fixed backboard that is about one meter wide and somewhat less in height, as shown schematically in FIG. 8. This antenna assembly can be installed on a two-wheel trailer, as shown in the figure, or alternatively on a tripod or other suitable platform.

Long-Range Operation

The so-called power-aperture product is the governing principle behind the design of any surveillance radar. Reducing the antenna area to illuminate a wider sector must be made up with increased power, all else being equal. This principle applies only to the area of the receive antenna, since the area of the transmit antenna is not a factor when the search frame time is held constant.

The power requirement may be very high for the combination of a long operating range and wide surveillance sector, and any further increase in power would be undesirable or infeasible. In such an application one can also use multiple non-scanning antennas on receive, as previously discussed, but here each antenna will illuminate separate parts of the surveillance sector, and the power will be reduced accordingly. In other words, it is the total area of all receive antennas that factor into the power-aperture product, even though they are used independently of each other. These antennas would be dedicated to search and remain fixed with respect to the surveillance sector. For target track, another set of antennas is used as an interferometer, which could slue to the particular sector where a target is detected, but this would not require much of a controlling or supporting mechanism.

The FM/CW waveform may lose its utility for long range operation, and pulsed operation would be preferred. Here the individual pulses can be unmodulated, but pulse compression operation, utilizing either phase or frequency modulation, offers the advantage of much lower peak power.

Even though many non-scanning antennas may be required, they will be simple, small, lightweight, and inexpensive, so their overall cost will be a small fraction of a large phased array antenna with similar capabilities.

CONCLUSION

Thus there has been described herein a non-scanning radar that can replace practically any existing radar with a mechanically or electronically scanned beam. The non-scanning radar uses relatively inexpensive hardware, shifting system complexity to the signal processor, which is readily commercially available now at a reasonable cost and coming down with time. Potential applications range from short-range detection of hostile fire to long-range air defense, and include systems on the ground, on the sea surface, in the air, and possibly even in space. While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a radar system comprising:
   continuously transmitting on a non-scanning antenna beam that encompasses an entire search space;
   continuously receiving returns from all targets in the search space on each of multiple, spaced apart non-scanning receive antennas, each of which also encompass the entire search space;
   processing returns received on each of the multiple, spaced apart non-scanning receive antennas to realize range resolution of the transmitted beam waveform;
   processing returns received on each of the multiple, spaced apart non-scanning receive antennas coherently to realize Doppler resolution of the processing interval;
   detecting the presence of a target or targets in the processed returns received on the multiple, spaced apart non-scanning receive antennas;
   processing target returns received on the multiple, spaced apart non-scanning receive antennas in combination and coherently to determine the azimuth or elevation angle of the detected targets;
   target detection, target tracking, and target analysis being performed simultaneously.

2. The method of claim 1 wherein the receive antennas are spaced apart in three dimensions and the returns from the multiple, spaced apart non-scanning receive antennas are processed in combination and coherently to determine both azimuth and elevation angle of the detected targets.

3. The method of claim 1 wherein the receive antennas are spaced apart in three dimensions and the returns from the multiple receive antennas are processed in combination and coherently to determine azimuth and elevation angles of the detected target by interferometry.

4. The method of claim 1 wherein the processing includes pulse compression to achieve high resolution in range and to measure target range.

5. The method of claim 1 wherein the processing includes Doppler filtering to suppress clutter.

6. The method of claim 1 wherein returns are received on each of the multiple receive antennas, and the multiple returns are processed coherently and non-coherently to detect the presence of a target.

7. The method of claim 1 wherein keystone processing is used to avoid the effects of migration of target returns in range.

8. The method of claim 1 wherein detecting the presence of a target includes a combination of coherent and noncoherent processing of the return.

9. The method of claim 1 used to detect and track one or more of projectiles, mortar shells, missiles, rockets, rocket-propelled grenades, bullets, aircraft, helicopters, unmanned air vehicles or other airborne objects.

10. The method of claim 1 used to detect and track boats, ground vehicles, and other objects on the sea surface or ground.

11. The method of claim 1 used to detect, track and score bomb drops.

12. The method of claim 1 wherein the returns from the multiple, spaced apart non-scanning receive antennas are processed in combination and coherently to determine azimuth and/or elevation angles of the detected target by interferometry.

13. A method of operating a radar system comprising:
   continuously transmitting on a non-scanning antenna beam that encompasses an entire search space;
   continuously receiving returns from all targets in the search space on each of multiple, spaced apart non-scanning receive antennas, each of which also encompass the entire search space;
   processing returns received on each of the multiple, spaced apart non-scanning receive antennas to realize range resolution of the transmitted beam waveform wherein the processing time is varied as a function of range using a longer processing time for longer range and a shorter processing time for shorter range;
   processing returns received on each of the multiple, spaced apart non-scanning receive antennas coherently to realize the Doppler resolution of the processing interval;
   detecting the presence of a target or targets in the processed returns received on the multiple receive antennas;
   processing target returns received on the multiple, spaced apart non-scanning receive antennas in combination and coherently to determine the azimuth or elevation angle of the detected targets;
   target detection, target tracking, and target analysis being performed simultaneously.

14. A method of operating a radar system comprising:
   continuously transmitting on a non-scanning antenna beam that encompasses an entire search space;
   continuously receiving returns from all targets in the search space on each of multiple, spaced apart non-scanning receive antennas, each of which also encompass the entire search space;
   processing returns received on each of the multiple, spaced apart non-scanning receive antennas to realize range resolution of the transmitted beam waveform wherein processing time is varied as a function of range using a longer processing time for longer range and a shorter processing time for shorter range;
   processing returns received on each of the multiple, spaced apart non-scanning receive antennas coherently to realize Doppler resolution of the processing interval;
   detecting the presence of a target or targets in the processed returns received on the multiple receive antennas;
   processing target returns received on the multiple, spaced apart non-scanning receive antennas in combination and coherently to determine the azimuth and/or elevation angle of the detected targets;
   target detection, target tracking, and target analysis being performed simultaneously.

* * * * *

UNITED STATES PATENT AND TRADEMARK OFFICE
CERTIFICATE OF CORRECTION

PATENT NO.       : 7,626,536 B1                                              Page 1 of 1
APPLICATION NO. : 11/115487
DATED            : December 1, 2009
INVENTOR(S)      : Rihaczek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Second Day of November, 2010

David J. Kappos
*Director of the United States Patent and Trademark Office*